April 29, 1969 C. BRYNKO 3,441,410

DEFORMATION IMAGING PROCESSES USING ELECTRICALLY PHOTOSENSITIVE PHOTOCHROMIC MATERIALS

Filed July 1, 1965

INVENTOR.
CARL BRYNKO

BY Ronald Zibelli
James J. Ralabate
ATTORNEYS

United States Patent Office 3,441,410
Patented Apr. 29, 1969

3,441,410

DEFORMATION IMAGING PROCESSES USING ELECTRICALLY PHOTOSENSITIVE PHOTOCHROMIC MATERIALS

Carl Brynko, West Webster, N.Y., assignor to Xerox Corporation, Rochester, N.Y., a corporation of New York Filed July 1, 1965, Ser. No. 468,733
Int. Cl. G03g 13/22
U.S. Cl. 96—1.1 14 Claims

ABSTRACT OF THE DISCLOSURE

The subject matter of this invention is directed towards an imaging system whereby a photochromic material may be exposed in such a manner that its conductivity properties may be altered to form an electrostatic latent image. Upon softening by exposure to heat or other suitable means a deformation pattern forms in the surface corresponding to said latent image.

This invention relates in general to a novel imaging system and, more specifically, to an imaging system employing light induced changes in the electrical properties of organic photochromic compounds.

Materials which undergo reversible photo-induced color change are referred to as photochromic. In the absence of actinic radiation these materials have a relatively stable configuration with a characteristic absorption spectrum. However, when a photochromic material is exposed to actinic radiation such as ultraviolet light, the absorption spectrum changes drastically so that the appearance of the material changes from colorless to red, red to green or the like. These property changes are believed to occur because of changes in the molecular or electronic configuration of the material from a lower to a higher energy state. These changes occur because the photochromic materials generally have very efficient routes for the internal conversion of absorbed excited state electronic energy into vibrational and torsional twisting modes of the molecule upon exposure to light. This conversion may, for example, result in the isomerization of the molecule. The conversion of each molecule normally takes place at an extremely rapid speed, but actual observation of a change in color in conventional systems takes longer because of the relatively low concentration produced per unit time and the depletion of the excited colored form by the competing but slower reconversion to the lower unexcited form. Accordingly, photochromic materials of lower conversion efficiency tend to produce pale color changes at best.

Unfortunately, the higher, colored form of the photochromic material exists in an excited, unstable condition which reverts to the lower form with its original absorption band and color after the source of actinic radiation is removed. Since imaging techniques proposed in the prior art employ the color change to make the image, these materials cannot be used in permanent imaging systems. Although an enormous amount of time, money and effort has been expended by many research organizations on attempting to stabilize the higher energy forms of a great many different photochromic compounds so as to make them suitable for use in practical imaging systems and although some success has been achieved in slowing down the reconversion of the higher to the lower form of some photochromic cmpounds with various modificatins of their substituents, no one has to date yet succeeded in permanently stabilizing these higher forms. Additional effort has been devoted to the problem of achieving maximum color change from the lower to the higher form of various photochromic compounds, but even had these goals been achieved, the problem of deactivating the lower form of photochromic material in background areas would still remain. In essence then, there have been two fixing problems in photochromic imaging involving both the stabilization of the higher colored form in exposed areas and the deactivation of the lower uncolored form in background areas of the image, and neither of these problems has been effectively solved. Consequently, the phenomenon of photochromism has remained largely a laboratory curiosity rather than an effective and commercially acceptable means of imaging.

It is accordingly an object of this invention to provide a novel imaging system.

It is a further object of the present invention to provide a novel imaging method based on the use of organic photochromic compounds.

Another object of this invention is to provide an imaging system which can effectively employ even those photochromic materials which exhibit little or no visible change in color on exposure.

A still further object of the invention is to provide an imaging method and apparatus utilizing photochromic compounds in which the image generated by image-wise exposure of the compound serves only as a temporary latent image for the developing and fixing steps which produce the permanent image that in no way depends upon the permanency of the higher form of the photochromic compound itself.

Yet another object of this invention is to provide a novel imaging method and apparatus in which photochromic compounds are employed to produce permanent thermoplastic deformation images.

The above and still further objects of the present invention are accomplished, generally speaking, by providing a system in which a layer of a photochromic compound is exposed to an image with actinic electromagnetic radiation. This exposure source may constitute a source of visible light, ultraviolet light, X-ray or any other radiation source which is capable of converting the photochromic compound from one form to the other. After image-wise conversion of at least a portion of the photochromic layer from one state to the other, the photochromic layer is charged, and because of the marked difference in charge transporting ability between the two states of the same photochromic compound a latent electrostatic charge pattern is formed on the photochromic layer. It should be emphasized here that the exposure must only convert enough photochromic molecules to produce a significant difference between the electrical properties of the exposed and unexposed areas. Because of the relatively small number of molecules which must be converted to fulfill this requirement with some materials a visible color change need not necessarily be produced in all instances. The photochromic layer is then softened as by the application of heat or solvent vapor until a thermoplastic deformation pattern appears on its surface. Notwithstanding the fact that these steps have been described sequentially, they may also be carried out simultaneously. The photohcromic layer may be composed solely of one or more photochromic compounds providing that at least one state of the photochromic compound has the requisite resistivity to hold the charge pattern long enough for deformation to take place upon softening. For convenience, however, the photochromic material will generally be dispersed or dissolved in solid solution in an insulating thermoplastic resin. This resin may be thought of as a binder or matrix for the photochromic material, which also serves as a deformable medium.

The use of such an insulating resin as a binder or matrix for the photochromic compound permits the choice of the photochromic compound to be made from an even larger group of materials including even those which have relatively low electrical resistivity in both the excited and the unexcited states, owing to the increased degree of resistivity which is imparted to the overall film by the resin. Since many photochromic compounds are relatively expensive the use of the resin also serves to decrease the overall cost of the imaging layer. In addition, since it has been found that certain resins inherently form very dense thermoplastic deformation images, resins of this type may be used to impart increased overall density to the imaging system.

In order that the invention will be more clearly understood, reference is now made to the accompanying drawings in which an embodiment of the invention is illustrated by way of example and in which.

Figure 1:
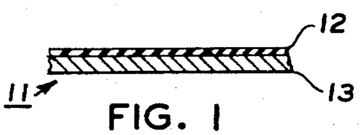
FIGURE 1 is a side sectional view of an imaging member made according to the invention.

Referring now to FIGURE 1, there is seen an imaging member generally designated 11 made up of a photoresponsive layer 12 on a supporting substrate 13. A conductive material, such as copper, brass, aluminum, silver, gold, optically transparent layers of tin oxide or copper iodide on glass or the like, may be employed to fabricate layer 13 so that the substrate will provide mechanical strength to the imaging member and will also serve as a conductive ground plane to facilitate electrical charging of the imaging member during the process as more fully described hereinafter. In the event that a charging technique which does not require a ground plane is employing and assuming that imaging layer 12 has sufficient mechanical strength of itself, the conductive substrate layer 13 may be eliminated from the system. One charging technique of this type is two-sided corona charging as described, for example, in U.S. Patent 2,922,883. Imaging layer 12 may, as stated above, consist entirely of a photochromic compound providing the compound has adequate strength and electrical resistivity in at least one of its states and further providing that it is strong enough to have structural integrity when coated and is capable of forming an electrostatically induced thermoplastic deformation pattern upon softening. This thermoplastic deformation may be of either the type known as "Frost" deformation, as described for example in article entitled "A Cyclic Xerographic Method Based on Frost Deformation" by R. W. Gundlach and C. J. Claus appearing in the January-February 1963 issue of the Journal of Photographic Science and Engineering, and as described in copending U.S. patent application Ser. No. 193,277, now U.S. Patent 3,196,011, filed May 8, 1962, entitled "Electrostatic Frosting" or it may be a type of deformation known as "Relief" as described, for example, in copending application Ser. No. 193,276, filed May 8, 1962.

Since most photochromic compounds are relatively expensive as compared with insulating thermoplastic resins which are suitable for use in combination therewith and since some photochromics have low physical strength, low resistivity or other properties which are undesirable for use in an imaging layer, as described above, the photochromic will generally be dissolved in or dispersed in a suitable insulating thermoplastic resin. Reference is made to the aforementioned patent applications and publication as well as to U.S. Patents 3,118,786, 3,055,006, 3,063,872, and 3,113,179 for a number of exemplary materials which have been used in thermoplastic deformation imaging. Any suitable resin may be used however. Typical insulating thermoplastic resins include Staybelite Ester 10 and Pentalyn H, pentaerythritol and glycerol esters, respectively, of partially (50%) hydrogenated rosin sold by the Hercules Powder Co. of Wilmington, Del.; Velsicol EL-11, a terpolymer of styrene, indene and isoprene, marketed by the Velsicol Chemical Co. of Chicago, Ill.; polyalpha-methyl styrene; Piccolyte S-70 and S-100 (polyterpene resins made predominantly from beta pinene available from the Pennsylvania Industrial Chemical Co. and having ring and ball melting points of 70° C. and 100° C., respectively); Piccopale 70SF and 85 (non-reactive olefin-diene resins, available from the Pennsylvania Industrial Chemical Co. having melting points of 70° C. and 85° C. and molecular weights of 800 and 1000, respectively); Piccodiene 2212 (a styrene-butadiene resin available from the same company); Piccolastic A-75, D-100 and E-100 (polystyrene resins with melting points of 75° C., 100° C. and 100° C. available from the same company); Neville R-21, R-9 and Nevillac Hard (cumarone-idene resins); Amberol ST137X (an unreactive, unmodified, phenol-formaldehyde resin available from Rohm & Haas); sucrose acetate isobutyrate; Arclor 1242 (a chlorinated polyphenyl; Pliolite AC (a styrene-acrylate copolymer); Pliolite VTAC (a vinyl toluene-acrylate copolymer); and Neolyn 23 (an alkyd resin available from Hercules Powder Co.).

As stated above the percentage of photochromic compound in the imaging coating 12 may range anywhere from 100% by weight of photochromic compound down to about one percent by weight of photochromic with the remainder being a resin of the type described herein. Any suitable photochromic compound may be employed. Typical photochromic compounds include:

Spiropyrans such as 1,3,3-trimethyl-6′-nitro-8′-allylspiro (2′H-1′-benzopyran-2,2′-indoline);
1,3,3-trimethyl-5,6′-dinitro-spiro (2′H-1′-benzopyran-2,2′-indoline);
1,3,3-trimethyl-7′-nitro-spiro (2′H-1-benzopyran-2,2′-indoline);
3-methyl-6-nitro-spiro-[2H-1-benzopyran-2,2′-(2′H-1′-beta-naphthopyran)];
1,3,3-trimethyl-8′-nitro-spiro (2′H-1′-benzopyran-2,2′-indoline);
1,3,3-trimethyl-6′-methoxy-8′-nitro-spiro (2′H-1′-benzopyran-2,2′-indoline);
1,3,3-trimethyl-5 chloro-5′- nitro-8′-methoxy-spiro (2′H-1′-benzopyran-2,2′-indoline);
1,3-dimethyl-3-isopropyl-6′ nitro-spiro (2′H-1′-benzopyran-2,2′-indoline);
1-phenyl-3,3-dimethyl-6′-nitro-8′-methoxy-spiro (2′H-1′-benzopyran-2,2′-indoline);
7′-nitro-spiro-[xantho-10,2′ (2′H-1′-betnzobetanapthopyran)];
3,3′-dimethyl-6′-nitro-spiro (2′H-1′-benzopyran-2,2′-benzothiazole);
3,3′-dimethyl-6′-nitro-spiro (2′H-1′-benzopyran-2,2′-benzo-oxazole);
1,3,3-trimethyl-6′-nitro-spiro (2′H-1′-benzopyran-2,2′-indoline);
6′-nitro-8′-methoxy-1,3,3-trimethylindolinobenzopyrylospiran;
6′-nitro-1,3,3-trimethylindolinobenzopyrylospiran;
8′-allyl-1,3,3-trimethylindolinobenzopyrylospiran;
8′-carbomethoxy-1,3,3-trimethylindolinobenzopyrylosprylospiran;
8′-methoxy-1,3,3-trimethylindolinobenzopyrylospiran;
6′,8′-dinitro-1,3,3-trimethylindolinobenzopyrylospiran;
7′-nitro-1,3,3-trimethylindolinobenzopyrylospiran;
8′-nitro-1,3,3-trimethylindolinobenzopyrylospiran;
6′,8′-dibromo-1,3,3-trimethylindolinobenzopyrylospiran;
6′-chloro-8′-nitro-1,3,3-trimethylindolinobenzopyrylospiran;
5-nitro-6′-nitro-1,3,3-trimethylindolinobenzopyrylospiran;
6′-nitro-8′-fluoro-1,3,3-trimethylindolinobenzopyrylospiran;
6′-methoxy-8′-nitro-1,3,3-trimethylindolinobenzopyrylospiran;
5′-nitro-8′-methoxy-1,3,3-trimethylindolinobenzopyrylospiran;
6′-bromo-8′-nitro-1,3,3-trimethylindolinobenzopyrylospiran.

Anthrones such as bianthrone;
xanthylideneanthrone;
4,4'-methylanthrone;
4,4'-methoxybianthrone;
3-chloro-10-(9'-xanthylidene)-anthrone;
3-methyl-10-(9'-xanthylidene)-anthrone;
4'-chloro-10-(9'-xanthylidene)-anthrone; and
10'-9'-2'-methyl xanthylidene)-anthrone.

Sydnones such as

N-(3-pyridyl)-sydone;
N-benzylsydnone;
N-p-methylbenzyl-sydnone;
N-3, 4-dimethylbenzylsydnone;
N-p-chlorobenzylsydnone;
N,N'-ethylene-bissydnone; and
N,N'-tetramethylenebissydnone.

Anils such as salicylidene aniline;
5-bromo salicylidene-alpha-naphthylamine;
salicylidene-m-phenylenediamine;
salicylidene-m-phenylenediamine;
salicylidene-m-toluidine;
salicylidene 3,4-xylidene;
salicylidene-p-anisidine;
o-nitrobenzidene-p-aminobiphenyl;
o-nitrobenzidene-m-nitroaniline;
o-nitrobenzidene-p-phenetidine;
salicylidene-p-aminobenzoic acid;
p-hydroxy benzidene-p-bromoaniline;
p-hydroxybenzidene 2,4-xylidine;
2-hydroxy-3-methoxybenzidene 2,5-xylidine; and
salicylidene-o-chloroaniline.

Hydrazones such as the 2,4-dinitrophenylhydrazone of 5-nitrosalicylaldehyde;
benzaldehyde beta-naphthyl-hydrazone;
benzaldehyde anisylhydrazone;
benzaldehyde-m-chloro-phenylhydrazone;
benzaldehyde-p-bromophenylhydrazone;
cinnamaldehyde phenylhydrazone;
cinnamaldehyde beta-naphthylhydrazone;
cinnamaldehyde m-tolylhydrazone;
cinnamaldehyde p-tolyhydrazone;
cinnamaldehyde 3,4-xylylhydrazone;
p-dimethylamino benzaldehyde beta-naphthylhydrazone;
2-furaldehyde beta-naphthylhydrazone;
1-phenol-1-hexen-3-one-phenylhydrazone;
piperonal anisylhydrazone;
piperonal m-chloro-phenylhydrazone;
piperonal beta-naphthylhydrazone;
piperonal m-tolyhydrazone;
p-tolualdehyde phenylhydrazone;
vanillin beta-naphthylhydrazone.

Osazones such as benzil beta-naphthylosazone;
benzil m-tolylosazone;
benzil 2,4-xylylosazone;
4,4'-dimethoxy benzil beta-naphthylosazone;
4,4'-dimethoxy benzil phenylosazone;
4,4'-dimethoxy benzil-2,4-xylylosazone;
3,4,3',4'-bis (methylene-dioxy) benzil alpha-naphthylosazone;
3,4,3'4',bis(methylene-dioxy) benzil 2,4-xylylosazone.

Semicarbazones such as chalcone semicarbazone;
chalcone phenyl semicarbazone;
2-nitrochalcone semicarbazone;
3-nitrochalcone semicarbazone;
cinnamaldehyde semicarbazone;
cinnamaldehyde thiosemicarbazone;
o-methoxy cinnamaldehyde semicarbazone;
o-methoxy cinnamaldehyde thiosemicarbazone;
o-methoxy cinnamaldehyde phenylsemicarbazone;
1-(4-methoxyphenyl)-5-methyl-1-hexen-3-one-semicarbazone;
1-(1-naphthyl)-1-hexen-3-one-semicarbazone;
1-phenyl-1-penten-3-one semicarbazone.

Stilbene derivitives such as 4,4'-diformamido-2,2'-stilbene disulfonic acid;
4,4'-diacetamido-2,2' stilbene disulfonic acid and its sodium, potassium, barium, strontium, calcium, magnesium and lead salts;
4,4'-bis(4-acetamidobenzoyleneamido)-2,2'-stilbene disulfonic acid;
4,4'-bis(p-(p-acetamidobenzamido)benzamido) 2,2'-stilbene disulfonic acid.

Fulgides (substituted succinic anhydrides) such as alpha-anisyl-gamma-phenyl fulgide;
alpha, gamma-dianisyl fulgide;
alpha, gamma;
dicumyliso fulgide;
alpha, gamma-diphenyl fulgide;
alpha, gamma-distyryl fulgide;
alpha-piperonyl-gamma-phenyl fulgide;
tetraphenyl fulgide.

Amino-camphor compounds such as 3-(p-dimethylaminophenylamino)-camphor and
3-(p-diethylaminophenylamino)-camphor.
Thioindigo dyes.

o-Nitrobenzyl derivatives such as 2-(2',4'-dinitrobenzyl) pyridine;
2,4,2'-trinitrodiphenylmethane;
2,4,2',4',2'',4''-hexanitrotriphenylmethane;
ethyl bis (2,4-dinitrophenyl)acetate;
2-(2'-nitro-4'-carboxybenzyl pyridine;
3,3'-dinitro-4,4'-bis (2 pyridylmethyl)-azoxybenzen; and
4-(2'-nitro-4'-cyanobenzyl) pyridine.

The spiropyrans are, however, a preferred class of materials owing to their superior and more sensitive imaging capabilities. Whether photoresponsive layer 12 consists of a pure photochromic compound or a blend of a photochromic compound with a resin as described above, it may be coated on the substrate or formed into a self-supporting layer by a convenient technique such as dip coating, extrusion, whirl coating, casting or the like using either a hot melt or a solution of the materials to be coated. Thus, for example, a blend of a photochromic compound and a resin may be coated from solution in toluene, xylene, acetone, methyl ethyl ketone, hexane, methanol or any other suitable solvent. In fact, solvent coating or casting is a particularly desirable way to form the photoresponsive layer especially if it is to be used just subsequent to formation, since some residual solvent may be left behind in the coating or cast film to keep it in a softened or viscous liquid condition so as to facilitate the formation of the thermoplastic deformation image, as more fully explained hereinafter. Materials which have not fully cooled from the hot melt condition may also be desirable for this purpose where imaging is to take place just subsequent to layer formation. In fact, since one of the imaging steps involves softening the imaging material to a viscous liquid or soft solid form, photochromic materials which are not solid at ordinary room temperatures or photochromic materials in solution with resins, which resins are not fully solid at room temperature, (about 70° F.), may be employed and the final images may be fixed by cooling the imaging layer below room temperature or cross-linking the material after imaging so as to harden and freeze the deformation image, as more fully explained hereinafter. Typical resins which have this property and can be used to form thermoplastic deformation images, include: Piccolastic A5, A25 and A50 (three polystyrene resins in the 300–400 molecular weight range) and Staybelite Ester 3 a triethyleneglycol ester of partially (50%) hydrogenated rosin.

Figure 2:
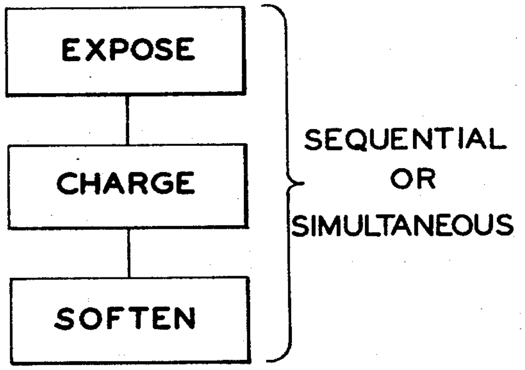
FIGURE 2 is a flow diagram of the process steps of the invention.

As shown in FIGURE 2, the steps involved in carrying out the process involve exposing the photoresponsive layer 12 of imaging layer 11 to an image-wise pattern of actinic electromagnetic radiation, applying electrostatic charge to this layer and softening it until a deformation pattern conforming to the exposure pattern is formed thereon. Although the process steps have been described in certain sequence and this sequence may be followed to form the image, it should be understood that this sequence is only one of several alternate procedures for image formation. In fact, all three process steps may be carried out simultaneously with the photoresponsive layer 12 being exposed to an image while it is being electrically charged from a discharge electrode and also during softening of this layer as by the application of heat or a solvent vapor. It should also be understood that even when the process steps are carried out sequentially the specific sequence described above is not required since softening of the film may take place prior to the other two imaging steps or an inherently soft layer may be eliminated altogether or charging may take place prior to exposure followed by softening. All that is required is that a charge pattern conforming to the image to be reproduced exist on the photoresponsive layer 12 while it is in its softened condition. In fact, softening prior to exposure is preferred as this increases efficiency of the photochromic conversion. It is believed that under these conditions the electrostatic repulsion forces of the charge pattern exceed the surface tension forces of the softened film and when this critical or threshold condition is met, a pattern of deformation forms on the surface of layer 12. After the deformation pattern is formed it may optionally be fixed by causing the film to revert to the solid state. This hardening may be accomplished by the removal of the solvent vapor or heat source used to soften the film or where an initially soft film is employed, by cooling below the freezing point of the layer or by exposing the layer to a uniform source of radiation capable of polymerizing or crosslinking it. Where the film is not permanently hardened by crosslinking or similar processes which modify the molecular structure thereof, the image formed by the deformation pattern may be erased at any time simply by resoftening it and maintaining it at a low viscosity for a sufficient period of time. If the film has not already been discharged by electrical leakage currents, discharge will occur by fluid migration of the ions making up the charge pattern through the softened film and surface tension forces will then restore a smooth surface to it so that it is ready for reuse in the system as desired, assuming the photochromic has reverted to its original state.

In exposing to the image to be reproduced any source of electromagnetic radiation which is actinic to the photochromic material may be employed. In the case of most photochromic compounds in their lower or unexcited forms an ultraviolet radiation source may be conveniently employed to expose the material in image-wise configuration so as to convert exposed areas to the higher or excited form of the material, although light of this short wavelength is not always required. Since many photochromic materials in their higher or excited forms may be "triggered" or caused to revert to the lower unexcited form by exposure to visible light, a light source in the visible range (from about 4000–7500 angstrom units) may be conveniently employed for image-wise exposure of a photochromic film which had initially been uniformly converted to the higher or excited form. This type of exposure will then convert exposed areas to the unexcited or lower form of the photochromic material while the background or unexposed areas remain in the excited form. Providing that the image is developed (by charging and softening) before the background areas of the photochromic material revert to the lower unexcited form by spontaneous relaxation, this technique may be conveniently employed for positive to negative imaging. The intensity of the exposure need not necessarily be strong enough to produce an intense color change in the photochromic compound since with most materials this requires a conversion of a gross amount of the photochromic from one form to the other, while to be operative in the process of this invention only enough photochromic material must be converted so that a differential charge pattern can be formed on imaging layer 12. The term "photochromic" should be understood in this context as it is used throughout the specification and claims.

Any suitable electrostatic charging technique may be employed to carry out the charging technique. Typical electrostatic charging techniques include corona discharge as described in the U.S. Patent 2,588,699 to Carlson; 2,836,725 to Vyverberg; and 2,777,957 to Walkup; induction charging as described in the U.S. Patent 2,833,930 to Walkup and triboelectric charging by rubbing the surface to be charged with a material remote from it in the triboelectric series as described in the xerographic process in the U.S. Patent 2,297,691 to Carlson. With materials which have a relatively low level of electrical resistivity in both forms but which do have a significant differential in electrical resistivity between the excited and unexcited form (even to the point where an image cannot be formed by the sequential process) an image can frequently be formed by continuing to apply the charge pattern during the time when the material is in its softened or viscous condition. In this way charge which is drained off from the most resistive areas is continuously replaced by newly deposited charge so the charge level will exceed the threshold value for deformation to take place.

Figure 3:
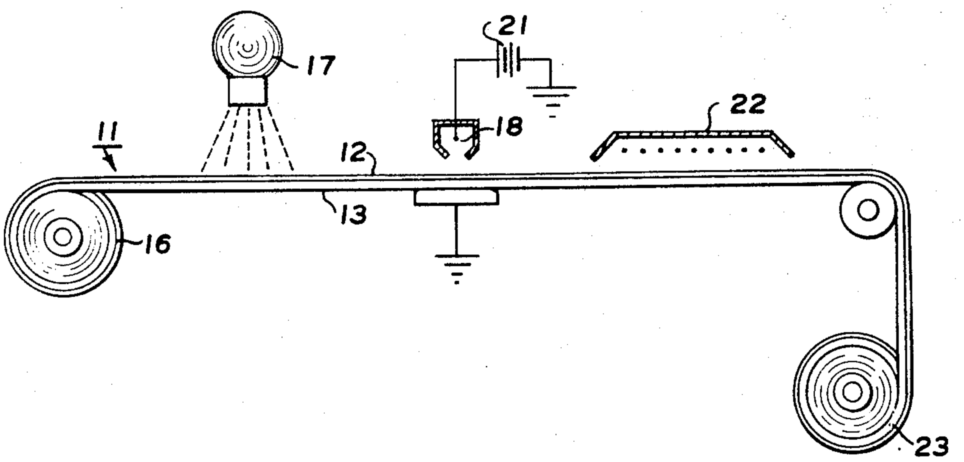
FIGURE 3 is a side sectional view of an illustrative embodiment of an apparatus adapted for imaging according to the invention.

In FIGURE 3 there is illustrated a simple exemplary apparatus for carrying out the imaging technique of this invention. In this figure there is shown a web of imaging material of the same type as the imaging member 11 in FIGURE 1 and, accordingly, this web has been numbered in accordance with the designations on FIGURE 1. This web 11 containing a small amount of residual solvent to facilitate the photochromic conversion comes off a supply roll 16 and first passes under a projector 17 which exposes it to the image to be reproduced with an actinic light source. Any suitable projector may be employed for this purpose and may either be of the type which flashes a full frame exposure on the web or may be a scanning projector which scans the image to be reproduced in synchronism with the movement of the imaging web itself. Where longer exposures are required, the web may be stopped and held in position for exposure prior to moving on to the other imaging station. Where it is inconvenient to employ an imaging web containing a smal amount of residual solvent, a solvent vapor treating station may be provided in the device prior to the exposure station. After exposure the web passes between a corona discharge electrode 18 and a grounded base electrode 19 which is in sliding contact with the conductive backing 13 of the imaging web. The corona discharge electrode 18 is of conventional construction as described more fully in U.S. Patent 2,836,725 to Vyverberg and is connected to one side of a D.C. voltage source 21, the other side of which is grounded. In this way a uniform level or charge is initially deposited on imaging web 11 by the corona discharge deposition of charged ions generated by electrode 18. Owing to the differential pattern of conductivity formed in photoresponsive layer 12 by the exposure from projector 17, charge in the more conductive areas of the film rapidly drain away providing a pattern of charge thereon which corresponds to the original exposure. Following charging, web 11 then passes beneath a radiant heater 22; this heater softens layer 12 allowing the deformation pattern to form, and once layer 12 has cooled so as to freeze the deformation image in place, the web is wound up on a take-up reel 23.

The following illustrative examples of preferred embodiments of the invention are now given to enable those skilled in the art to more clearly understand and practice the invention described above. Unless otherwise indicated all parts and percentages are taken by weight.

Example I

Two grams of 6'-nitro-1,3,3-trimethylindolinobenzopyrylospiran and 4 grams of Staybelite Ester 10 resin (described above) are dissolved in 94 grams of toluene. This solution is dip coated in the dark to a thickness of about 1 micron on an aluminum plate and air dried. The dried film is then exposed to an image with a 9-watt fluorescent light available from the Eastern Corporation of Westbury Long Island under the tradename Blacklite using a filter which passes about a 10 angstrom bandwidth centered on 3660 angstroms. After image-wise exposure, a maroon color image is seen to form on the film. The film is then charged by passing it under a 3-wire corrotron held at 8500 volts positive with respect to the aluminum base of the plate. The image created by the exposure on the coating shows a charge retention of about 400 volts in unexposed areas and 50 volts in the exposed areas when measured with an electrometer under normal ambient lighting in the laboratory. Following charging the film is heated with a hot air gun, and a fine grain frost deformation pattern appears in unexposed areas. Upon cooling this thermoplastic deformation pattern is fronzen in the film. After the relatively long room light exposure the maroon image fades as the photochromic compound reverts back to its original colorless form but the deformation pattern is permanently retained on the surface of the film.

Example II

The procedure of Example I is repeated except that the charging electrode is held at a negative potential with respect to the plate with approximately the same results.

Examples III and IV

The procedure of Example I is repeated with the exception that in Example II 4 grams of the Staybelite Ester resin and ½ gram of the 6'-nitro-1,3,3-trimethylindolinobenzopyrylospiran are used in the coating solution while in Example IV the ratio is 1 gram of resin to 2 grams of the same photochromic spiran compound. Each of these produce about equal results with those produced by Example I.

Examples V–XVI

The procedure of Example I is followed exactly with the exception that the following resins are substituted for the Staybelite Ester resin of Example I in Examples V–XVI, respectively; Piccolyte S–70, Piccolyte S–100, Piccopale 70SF, Piccopale 85, Piccodiene 2212, alpha methylstyrene polymer, Amberol ST137X, Piccolastic D–100, Piccolastic E–100, Neville R–9, Neville R–21, and Nevillac Hard. All produce about the same results as Example I.

Examples XVII–XXII

In Examples XVII and XVIII the procedure of Example I is repeated except that the photochromic compound employed is 3-N-pyridyl sydnone in Example XVII and Phenyl sydnone in Example XVIII.

In Examples XIX–XXII the following photochromic compounds are employed. In Example XIX bianthrone is employed; in Example XX 9-xanthylidene anthrone is employed; in Example XXI the 2,4-dinitrophenylhydrazone of 5-nitro-salicylaldehyde is employed; and in Example XXII 3-N-pyridyl salicylaldehyde is employed. In these four examples the procedure of Example I is followed except that the same filter is employed with a 100 watt light source for a 20 minute exposure. In all instances the thermoplastic deformation patterns formed are about equal in quality with the one produced by the procedure of Example I except that the last two examples produce reversal (positive to negative) images, apparently because the excited form of these photochromics is more conductive than the unexcited form.

Example XXIII

The procedure of Example I is repeated exactly except that the coated film is first uniformly exposed to the 3660 angstrom light source until it achieves a deep maroon color. Following this exposure a transparency to be reproduced is overlaid on the imaging layer and exposed to a source of yellow light for an hour which serves to bleach or reconvert the excited colored form of the photochromic compound back to its unexcited, colorless form in exposed areas. The charging and softening steps of Example I are then carried out resulting in a thermoplastic deformation pattern on the film which is a photographic reversal of the original transparency.

Examples XXIV–XXX

The procedure of Example I is followed with the exception that Amberol ST–137X resin is substituted for the Staybelite Ester resin of Example I and the following photochromic compounds are used respectively, in Examples XXIV–XXX in place of the spiropyran photochromic compound of Example I: 2,4-dinitro-phenylhydrazone; benzil beta-naphthylosazone; 2-nitrochalcone semicarbazone; alpha,gamma-diphenyl fulgide; 4,4'-diformamido-2,2'-stilbene disulfonic acid; 3-(p-dimethylaminophenylamino)-camphor; and 2-(2',4'-dinitrobenzyl) pyridine. These produce essentially the same results as Example I when a 20 minute exposure is employed.

Although specific materials and conditions are set forth in the above examples, these are merely illustrative of the present invention. Various other materials, such as any of the typical photochromic and/or insulating resins listed above which are suitable, may be substituted for the materials listed in the examples with similar results. The films of this invention may also have other materials mixed, dispersed, copolymerized or otherwise added thereto to enhance, sensitize, synergize or otherwise modify the properties thereof. For example, a great many sensitizers are known to accelerate the conversion of photochromic compounds from one photochromic state to the other and any of these which are suitable for use herein may be employed. In addition to carrying out the process steps simultaneously or sequentially many other modifications and/or additions to the process will readily occur to those skilled in the art upon reading this disclosure, and these are intended to be encompassed within the spirit of the invention. Thus, for example, the charge pattern may be formed on the photochromic layer and then transferred to another insulating thermoplastic layer so that the thermoplastic deformation pattern may be formed thereon. The film may also be erased by uniformly converting all of the photochromic material therein to one state or the other and softening the film (if the deformation pattern was formed thereon) so as to ready the material for reuse.

What is claimed is:

1. A photographic method comprising exposing a thermoplastic imaging layer including an organic photochromic material to a pattern to be reproduced with an actinic electromagnetic radiation source of sufficient energy to convert at least a portion of said material from one photochromic state to another, said photochromic material capable of exhibiting a change in electrical conductivity upon exposure to said radiation, charging said imaging layer thereby developing an electrostatic latent image thereon and softening said imaging layer until a deformation pattern forms corresponding to said latent image.

2. A method according to claim 1 in which said photochromic material is initially in its lower, unexcited state and said eelctromagnetic radiation is of sufficient energy to convert exposed areas thereof to a higher excited photochromic state having increased conductivity.

3. A method according to claim 1 in which said photochromic material is initially in its higher excited state and said electromagnetic radiation source is of sufficient energy to convert exposed areas thereof to a lower unexcited photochromic state having decreased conductivity.

4. A method according to claim 1 including softening said imaging layer at least slightly prior to exposure.

5. A method according to claim 1 further including the step of converting said imaging layer to the solid state after the formation of said deformation pattern thereon so as to freeze said pattern in place.

6. A method according to claim 1 wherein said softening of said imaging layer is achieved by applying heat thereto and further including the step of cooling said imaging layer after the formation of said deformation pattern so as to solidify said layer and freeze said pattern in place.

7. A method according to claim 1 wherein said softening of said imaging layer is achieved by bringing said layer in contact with the vapor of a material which is at least a partial solvent therefor and further including the step of removing said imaging layer from contact with said vapor after the formation of said deformation pattern so as to reconvert said imaging layer to the solid state thereby fixing said deformation pattern.

8. A photographic method comprising exposing a thermoplastic imaging layer comprising a photochromic 1,3,3-trimethylindolinobenzopyrylospiran material to a pattern to be reproduced with an actinic electromagnetic radiation source of sufficient energy to convert at least a portion of said material from one photochromic state to another, charging said imaging layer thereby forming an electrostatic latent image thereon, and softening said imaging layer until a deformation pattern forms corresponding to said latent image.

9. A method according to claim 8 wherein said photochromic material comprises 6′-nitro-1,3,3-trimethylindolinobenzopyrylospiran.

10. A photographic method comprising exposing an imaging layer comprising a solid solution of an insulating thermoplastic resin and an organic photochromic material to a pattern to be reproduced with an actinic electromagnetic radiation source of sufficient energy to convert at least a portion of said material from one photochromic state to another, said photochromic material capable of exhibiting a change in electrical conductivity upon exposure to said radiation, charging said imaging layer thereby developing an electrostatic latent image thereon and softening said imaging layer until deformation pattern forms corresponding to said latent image.

11. A method according to claim 10 wherein said imaging layer comprises from about 1 part by weight of photochromic material to about 8 parts by weight of resin to about 1 part by weight of photochromic material to about ½ part by weight of resin.

12. A method according to claim 10 wherein said photochromic material comprises 6′-nitro-1,3,3-trimethylindolinobenzopyrylospiran.

13. A method of forming a latent electrostatic image comprising exposing an imaging layer comprising an organic photochromic material to a pattern to be reproduced with an actinic electromagnetic radiation source of sufficient energy to convert at least a portion of said photochromic material from one photochromic state to another, said photochromic material capable of exhibiting a charge in electrical conductivity upon exposure to said radiation, and uniformly applying charge thereto.

14. A method according to claim 13 further including the step of softening said imaging layer prior to exposure.

References Cited

UNITED STATES PATENTS

| | | | |
|---|---|---|---|
| 3,081,165 | 3/1963 | Ebert | 96—1 |
| 3,113,022 | 12/1963 | Cassiers et al. | 96—1 |
| 3,238,041 | 3/1966 | Corrsin | 96—1 |
| 3,311,471 | 3/1967 | Hepher | 96—1.5 |
| 3,346,385 | 10/1967 | Foris | 96—36 |

OTHER REFERENCES

Exelby and Grinter: Chem. Reviews, vol. 65, 1965, pp. 247–60.

Theortical and Experimental Investigations of Photochromic Memory Techniques and Devices, ad No. 273,512, p. 7.

Giaimo: RCA Review, December 1964, p. 694.

NORMAN G. TORCHIN, *Primary Examiner.*

JOHN C. COOPER III, *Assistant Examiner.*

U.S. Cl. X.R.

96—1, 1.5, 90